Feb. 14, 1933.  E. J. MARTIN  1,897,811
INDICATOR
Filed March 28, 1928
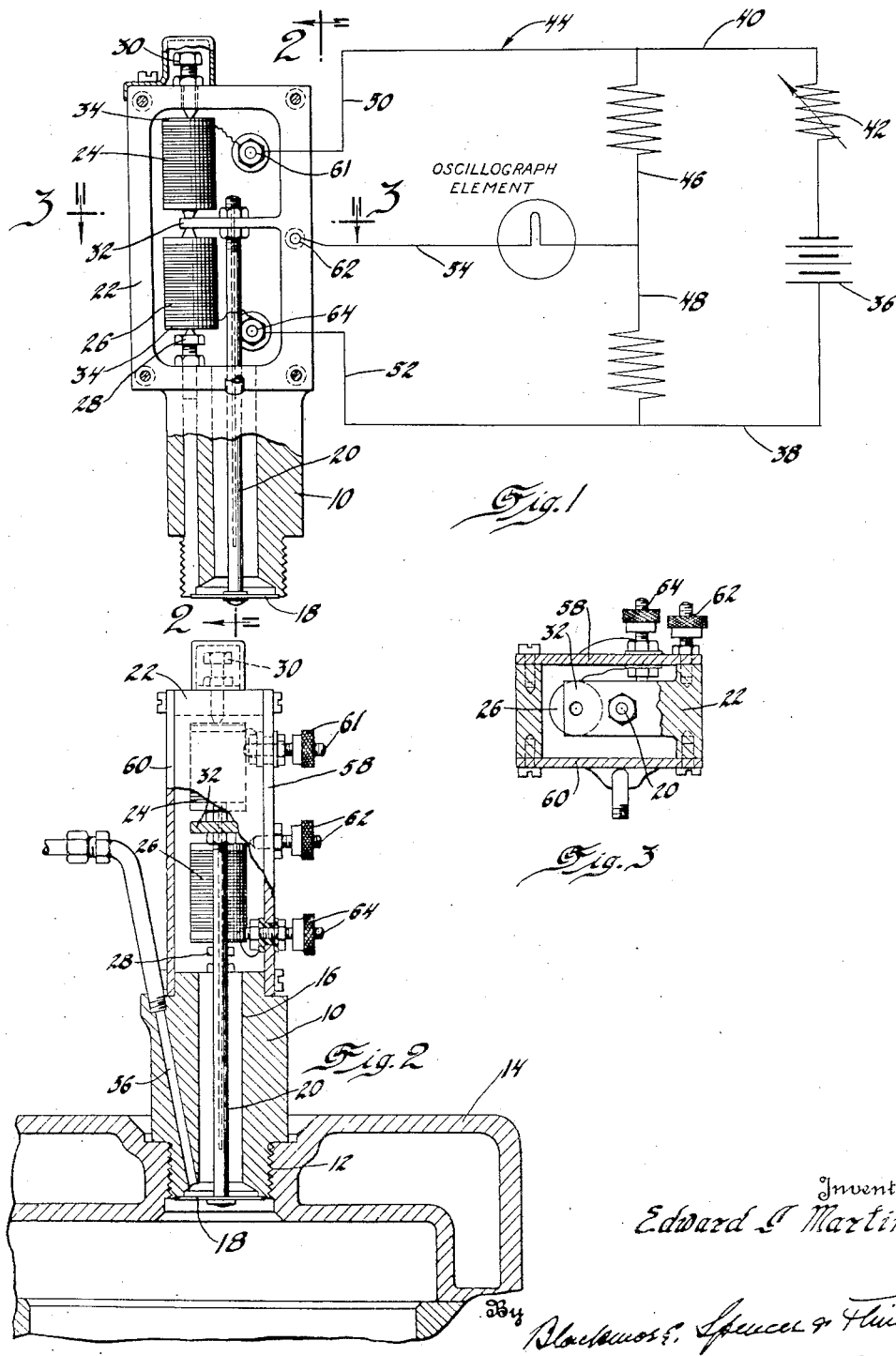

Patented Feb. 14, 1933

1,897,811

UNITED STATES PATENT OFFICE

EDWARD J. MARTIN, OF DETROIT, MICHIGAN, ASSIGNOR TO GENERAL MOTORS RESEARCH CORPORATION, OF DETROIT, MICHIGAN, A CORPORATION OF DELAWARE

INDICATOR

Application filed March 28, 1928. Serial No. 265,452.

This invention relates to improvements in indicating mechanisms of the type in which sensitive resistance elements such as carbon piles are placed in an electric circuit to control the current and operate suitable indicating mechanism. I prefer to employ a circuit employing a Wheatstone bridge and to insert the resistance element in one side of the bridge, in such case the bridge element is provided with a movable part interposed between the resistance elements and adapted to vary the resistance thereof. Variation in the resistance of the rheostats produces a difference in potential across the bridge causing a flow of current which may be employed to operate any suitable recording meter or indicator, preferably an oscillograph.

My improvements consist in making the movable member controlling the rheostats in the form of a relatively rigid element preferably an integral arm extending outwardly from the frame in which the rheostats are mounted.

I have also adapted indicating mechanism of this type for use in measuring rapidly fluctuating pressure variations particularly the pressure variations occurring in the combustion chamber of an internal combustion engine. For this purpose I have connected the movable arm of the indicator with a rigid thrust member having a part projecting into the combustion chamber through a suitable opening therein. The opening is preferably sealed by means of a diaphragm connected to the thrust member and to the chamber. With the described apparatus variations in pressure and in the combustion chamber produce movement of the thrust member which is transmitted to the relative rigid element of the indicating mechanism and operates the latter. By using a rigid arm for the movable element of the indicating mechanism and operating the arm by means of a rigid thrust member directly exposed to the combustion chamber pressure, I am enabled to use the diaphragm for sealing only and to relieve it of strains to which it would be subjected were it directly employed to actuate the indicating mechanism. By this means the life of the diaphragm is greatly lengthened.

My invention involves other features of novelty which will be pointed out in the course of the following description.

In the drawing:

Figure 1 is an elevation of my indicator with parts in section and the cover removed, and showing the circuit with which it is used.

Figure 2 is a view on line 2—2 of Figure 1.

Figure 3 is a view on line 3—3 of Figure 1.

The frame of my indicator includes a plug portion 10 having its lower end threaded for reception in a threaded aperture 12 in a wall of the chamber within which it is desired to study the pressure variations. My improved apparatus is especially designed to indicate pressure variations in the combustion chamber of an internal combustion engine, and I have indicated such chamber at 14. The plug portion 10 is provided with a central bore 16 the lower end of which is closed by a diaphragm 18. To the center of the diaphragm is rigidly secured the thrust member 20. The diaphragm 18 is secured to the plug portion 10 and the thrust member 20 in such manner as to provide gastight joints. I prefer to accomplish this by welding or brazing.

The indicating mechanism is of the type known as a telemeter but in it I have embodied an improvement to be later pointed out. The upper portion of the frame is indicated by numeral 22, and within it are located carbon pile rheostats 24 and 26 clamped between adjusting screws 28 and 30. Between the adjacent ends of the rheostats is located an arm 32 and to this arm is rigidly connected the thrust element 20. The arm 32 is relatively rigid and is preferably an integral extension of the frame. However, it is inherently flexible or yielding within narrow limits.

The adjusting screws 28 and 30 are provided with conical heads as shown and between the heads and the end pressure plates of the rheostats are interposed insulating members 34 preferably in the form of mica disks. The adjacent pressure plates are similarly provided with conical lugs engaging the yielding arm 32. If preferred the rheostats may be insulated from the arm 32 but I have preferred to include the arm in the indicating circuit in the manner to be described.

36 indicates a battery supplying current through the conductors 38 and 40 and a variable resistance 42 to a Wheatstone bridge indicated at 44. The arms 46 and 48 of the bridge include balanced fixed resistances in the usual manner. The arms 50 and 52 of the bridge include the carbon pile rheostats 24 and 26 respectively. 54 indicates the bridging element connected at one end at a point between the arms 46 and 48 and at the other end to the adjacent ends of the carbon pile rheostats. This connection is preferably made through frame 22, arm 32 and the contacting pressure plates of the rheostats. In the bridging element 54 is interposed the oscillograph element which, as is well-known, produces movement of a mirror in synchronism with the current fluctuations in the conductor 54 causing a light ray to be projected on a traveling photographic roll.

The apparatus operates as follows: Pressure variations in the combustion chamber 14 cause reciprocating movement of the thrust member 20 causing corresponding flexing of the arm 32 varying the pressure on the carbon piles and consequently the resistances in the corresponding arms of the Wheatstone bridge. This in turn varies the potential at the rheostat end of the bridging conductor 54 causing a flow of current therethrough in either one direction or the other. This flow operates the oscillograph. By this means the rapid fluctuations of pressure in the combustion chamber are accurately indicated and recorded.

The construction is simple and sturdy and is particularly designed so that the diaphragm 18 is subjected to a minimum of strain. By employing a relatively rigid arm 32, the amplitude of movement of the mechanical parts of the indicator is small although entirely sufficient for accurate indications when employing the sensitive indicating apparatus herein disclosed.

To prevent overheating of the diaphragm I have preferably bored the plug 10 at 56 and connected the bore with a source of compressed air. The cooling air strikes the diaphragm 18 and is discharged upwardly through the bore 16.

I have provided the upper portion 22 of the frame with covers 58 and 60 so that the rheostats may be enclosed. Through the cover 58 may extend the terminal 61 electrically connected to the upper end of the upper rheostat; the terminal 62 electrically connected to the frame and the terminal 64 electrically connected to the bottom of the lower rheostat.

Obviously this mechanism may be employed for indicating pressure variations occurring in various types of apparatus and in so far as this invention relates to an improvement in telemeters it obviously is of use wherever telemeters may be employed. My invention is not limited to employment with the circuit herein disclosed. Obviously my indicator can be connected to a vacuum tube circuit or any other electric circuit in which the current could be controlled by it. In place of the oscillograph it is of course possible to employ any other electrical indicator or recording meter. It is also apparent that the current variations produced by my device, may before operating the indicator, be amplified by various means such as relays or vacuum tube circuits.

I claim:

1. In pressure indicating apparatus the combination of a plug adapted to be secured in an opening in a pressure chamber with its lower end extending into the opening and exposed to pressures therein, said plug being provided with a central bore extending through the lower end of the plug, a diaphragm extending across the bore at its extreme lower end and sealing the bore, a rigid thrust member centrally secured to the diaphragm and projecting through the bore, a frame integrally united with said plug, a relatively rigid yieldable arm projecting from the frame and connected to the thrust member, and a pressure sensitive rheostat operated by movement of said arm.

2. The combination of a chamber subject to rapid fluctuations in pressure therein, and an indicator including a diaphragm exposed to the pressure fluctuations in the chamber and arranged substantially flush with the adjacent portions of the walls of the chamber, said diaphragm sealing the indicator from the fluids in the chamber and pressure sensitive electrical means operated by movement of the diaphragm.

3. The combination of a chamber subject to rapid fluctuations in pressure therein, and an indicator including a diaphragm exposed to the pressure fluctuations in the chamber and arranged substantially flush with the adjacent portions of the walls of the chamber, and a relatively rigid yieldable member, said diaphragm sealing the indicator from the fluids in the chamber, rigid thrust means connecting the member and diaphragm, and a pressure sensitive rheostat operated by movement of the member.

4. A pressure indicator for internal combustion engines and the like comprising a rigid, one-piece frame adapted to be secured in an aperture in the wall of the combustion chamber or the like with its lower end projecting therein and extending to a point substantially flush with the adjacent portions of the inner surfaces of the walls of the chamber, said lower end of the frame being provided with a bore, a diaphragm closing the lower end of the bore, and means including an operating part for a telemetric system actuated by movement of the diaphragm in response to variations in pressure in the chamber.

5. A pressure indicator for internal combustion engines and the like comprising a rigid, one-piece frame adapted to be secured in an aperture in the wall of the combustion chamber or the like with its lower end projecting therein, said lower end of the frame being provided with a bore, a diaphragm closing the lower end of the bore and lying substantially flush with the adjacent portions of the inner surface of the walls of the chamber, said frame including an integral relatively rigid, yieldable arm, a thrust member rigidly connecting the diaphragm and arm, said yieldable arm serving as an operating member of a telemetric system.

6. A pressure indicator for internal combustion engines and the like comprising a rigid, one-piece frame adapted to be secured in an aperture in the wall of the combustion chamber or the like with its lower end projecting therein, said lower end of the frame being provided with a bore, a diaphragm closing the lower end of the bore and lying substantially flush with the adjacent portions of the inner surface of the walls of the chamber, said frame including an integral relatively rigid, yieldable arm, a thrust member rigidly connecting the diaphragm and arm, and an electrical resistance element carried by said frame and engaged by said arm, the resistance of said element varying in accordance with the pressure exerted thereon by the arm.

7. A pressure indicator of the telemetric type for use in internal combustion engines and the like comprising a rigid, one-piece frame adapted to be secured in an aperture in the wall of the combustion chamber or the like with its lower end projecting therein, said lower end of the frame being provided with a bore, a diaphragm closing the lower end of the bore and lying substantially flush with the adjacent portions of the inner surface of the walls of the chamber, said frame including an integral relatively rigid, yieldable arm, a thrust member rigidly connecting the diaphragm and arm, carbon piles secured in the frame on either side of said yieldable member and subject to changes in pressure and consequent changes in electrical resistance as a result of movement of said yieldable member.

8. In a telemetric device for indicating pressures in a chamber subject to rapid fluctuations in pressure and provided with an opening in its wall, an integral fitting adapted to be received in said opening and comprising a rigid frame, said fitting having a bore in its lower portion, said portion extending into the chamber to a position substantially flush with the adjacent portions of the wall of the chamber and being provided with a diaphragm extending thereacross at its lowermost portion and sealing the bore, a relatively rigid, yieldable member integral with the frame, a thrust member connecting the rigid member and the diaphragm, whereby variations in pressure in said chamber produce vibrations of said diaphragm which are transmitted through the thrust member to the relatively rigid yieldable member, said last named member serving as the actuator of a telemetric system.

9. In a telemetric device for indicating pressures in a chamber subject to rapid fluctuations in pressure and provided with an opening in its wall, an integral fitting adapted to be received in said opening and comprising a rigid frame, said fitting having a bore in its lower portion, said portion extending into the chamber to a position substantially flush with the adjacent portions of the wall of the chamber and being provided with a diaphragm extending thereacross at its lowermost portion and sealing the bore, a relatively rigid, yieldable member integral with the frame, a thrust member rigidly connecting the rigid member and the diaphragm, carbon piles secured to the frame on either side of said yieldable member and subject to changes in pressure and consequent changes in electrical resistance as a result of movement of said yieldable member, said carbon piles serving as the variable element in a telemetric system.

10. An indicator of the telemetric type comprising a rigid one piece frame having a bore therein, a diaphragm spanning the bore and rigidly secured at its edges to the frame, said frame including an integral relatively rigid yieldable arm, a thrust member rigidly connecting the diaphragm and arm, pressure sensitive resistances secured in the frame on either side of said yieldable arm and subject to changes in pressure and consequent changes in electrical resistance as a result of movement of said yieldable member, said diaphragm restricting the thrust member to minute axial movements.

11. In a telemetric device an integral frame having a bore therein, a flat diaphragm extending across the bore and rigidly secured to said frame, a relatively rigid yieldable member integral with the frame, a thrust member connecting the rigid member and the diaphragm, whereby variations in pressure on said thrust member produce corresponding movements of said relatively rigid yieldable member, said last named member serving as the actuator of a telemetric system and said diaphragm being adapted to restrict the thrust member to minute axial movements.

In testimony whereof I affix my signature.

EDWARD J. MARTIN.